(12) United States Patent
Sullivan et al.

(10) Patent No.: US 8,657,197 B2
(45) Date of Patent: *Feb. 25, 2014

(54) ACCOUNT APPLICATION PRODUCT, ASSOCIATED PACKAGE AND METHOD FOR PROCESSING AN ASSOCIATED APPLICATION

(71) Applicant: Target Brands, Inc., Minneapolis, MN (US)

(72) Inventors: Christopher Sullivan, Golden Valley, MN (US); Maria S. Holm, Lakeville, MN (US); Rachel Ann Delaney, Plymouth, MN (US); Kristin Watnemo Choi, Minnetonka, MN (US); Timothy D. Schumann, Arden Hills, MN (US); Jenna Bowar, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 31 days.

This patent is subject to a terminal disclaimer.

(21) Appl. No.: 13/692,660

(22) Filed: Dec. 3, 2012

(65) Prior Publication Data

US 2013/0092586 A1 Apr. 18, 2013

Related U.S. Application Data

(63) Continuation of application No. 12/572,817, filed on Oct. 2, 2009, now Pat. No. 8,322,619.

(51) Int. Cl.
*G06K 7/10* (2006.01)

(52) U.S. Cl.
USPC ...... 235/462.01; 235/493; 235/487; 235/494; 705/14.17; 705/35; 705/38

(58) Field of Classification Search
USPC .......... 235/462.01, 493, 487, 494; 705/14.17, 705/35, 38
See application file for complete search history.

(56) References Cited

U.S. PATENT DOCUMENTS 4,072,264 A * 2/1978 Kranz ............................ 229/72
4,317,538 A * 3/1982 Alter et al. .................... 229/72
(Continued)

OTHER PUBLICATIONS

Photograph of Special Financing Offer, publicly available in Circuit City stores at least as early as Fall 2007 (1 page).

(Continued)

*Primary Examiner* — Allyson Trail
(74) *Attorney, Agent, or Firm* — Griffiths & Seaton PLLC; JoAnn M. Seaton

(57) ABSTRACT

An account application product includes a package, an account identifier and a terms sheet. The package includes a first panel extending from a free edge to a first fold line, a second panel extending away from the first fold line to a second fold line, and a third panel extending away from the second fold line. The first panel is folded back along the first fold line toward a first surface of the second panel to define a storage area between the first panel and the second panel. The third panel is folded forward along the second fold line toward a second surface of the second panel. The account identifier indicates an account associated with the account application product and is configured to be machine readable. The terms sheet is selectively stored in the storage area and includes printed terms for the account. Associated packages and method are also disclosed.

18 Claims, 11 Drawing Sheets

(56) References Cited

U.S. PATENT DOCUMENTS

| | | |
|---|---|---|
| 4,941,574 A | 7/1990 | Meehan |
| 5,141,254 A | 8/1992 | Ring |
| 5,167,429 A | 12/1992 | Casale et al. |
| 5,326,964 A | 7/1994 | Risser |
| 5,650,209 A | 7/1997 | Ramsburg et al. |
| D382,668 S | 8/1997 | Dolan |
| 5,667,247 A | 9/1997 | Ramsburg et al. |
| D385,488 S | 10/1997 | Smith et al. |
| 5,720,158 A | 2/1998 | Goade, Sr. |
| 5,740,915 A | 4/1998 | Williams |
| D394,387 S | 5/1998 | Williams |
| 5,760,381 A | 6/1998 | Stich et al. |
| 5,777,305 A | 7/1998 | Smith et al. |
| 5,791,474 A | 8/1998 | Hansen |
| 5,918,909 A | 7/1999 | Fiala et al. |
| 5,921,584 A | 7/1999 | Goade, Sr. |
| 5,962,834 A | 10/1999 | Markman |
| 5,975,302 A | 11/1999 | Young |
| 6,109,439 A | 8/2000 | Goade, Sr. |
| 6,145,665 A | 11/2000 | Krahn |
| 6,224,108 B1 | 5/2001 | Klure |
| 6,315,206 B1 | 11/2001 | Hansen et al. |
| 6,325,284 B1 | 12/2001 | Walker et al. |
| 6,328,341 B2 | 12/2001 | Klure |
| 6,349,829 B1 | 2/2002 | Matheis et al. |
| 6,382,676 B1 | 5/2002 | Cochran et al. |
| 6,439,613 B2 | 8/2002 | Klure |
| 6,493,970 B1 | 12/2002 | McCarthy et al. |
| 6,543,809 B1 | 4/2003 | Kistner et al. |
| D479,688 S | 9/2003 | Kumakura et al. |
| 6,619,480 B1 | 9/2003 | Smith |
| 6,640,974 B2 | 11/2003 | Malone |
| 6,666,378 B2 | 12/2003 | Davila et al. |
| 6,708,434 B1 | 3/2004 | Zarrow et al. |
| 6,715,795 B2 | 4/2004 | Klure |
| 6,739,505 B2 | 5/2004 | Walker et al. |
| 6,799,678 B2 | 10/2004 | Sherman |
| 6,877,263 B2 | 4/2005 | Clark |
| D509,654 S | 9/2005 | Miller |
| 6,957,737 B1 | 10/2005 | Frederickson et al. |
| D512,456 S | 12/2005 | Diaz et al. |
| 7,011,249 B2 | 3/2006 | Tang |
| 7,024,807 B2 | 4/2006 | Street |
| 7,040,049 B2 | 5/2006 | Cox et al. |
| D523,742 S | 6/2006 | Windsor et al. |
| D524,653 S | 7/2006 | Baumgarten |
| D524,857 S | 7/2006 | Graves et al. |
| D524,858 S | 7/2006 | Graves et al. |
| D524,859 S | 7/2006 | Graves et al. |
| D533,220 S | 12/2006 | Graves et al. |
| 7,172,127 B1 | 2/2007 | Poland |
| 7,188,762 B2 | 3/2007 | Goade, Sr. et al. |
| 7,219,829 B2 | 5/2007 | Treat |
| 7,243,839 B2 | 7/2007 | Beck et al. |
| 7,252,197 B1 | 8/2007 | Voswinkel |
| 7,278,570 B2 | 10/2007 | McGee et al. |
| 7,364,073 B2 | 4/2008 | Webb |
| 7,494,056 B2 | 2/2009 | Sturm |
| D616,295 S | 5/2010 | Britt et al. |
| 2002/0088855 A1 | 7/2002 | Hodes |
| 2002/0157974 A1 | 10/2002 | Krahn |
| 2003/0150762 A1 | 8/2003 | Biller |
| 2004/0031709 A1* | 2/2004 | Taw et al. ............ 206/312 |
| 2005/0011802 A1 | 1/2005 | Chan |
| 2005/0017502 A1 | 1/2005 | Chariker |
| 2005/0061889 A1 | 3/2005 | McGee et al. |
| 2005/0125336 A1 | 6/2005 | Rosenblatt et al. |
| 2005/0173520 A1 | 8/2005 | Jaros et al. |
| 2005/0247798 A1 | 11/2005 | Graves et al. |
| 2005/0258060 A1 | 11/2005 | Katz |
| 2005/0279825 A1 | 12/2005 | Ashby et al. |
| 2005/0283436 A1 | 12/2005 | Greer et al. |
| 2006/0091202 A1 | 5/2006 | McInnis |
| 2006/0151348 A1 | 7/2006 | Willard |
| 2006/0208062 A1 | 9/2006 | Osborn et al. |
| 2006/0266665 A1 | 11/2006 | Clarke |
| 2006/0272962 A1 | 12/2006 | Chan |
| 2007/0022647 A1 | 2/2007 | Miller et al. |
| 2007/0045401 A1 | 3/2007 | Sturm |
| 2007/0061255 A1 | 3/2007 | Epting et al. |
| 2007/0063021 A1 | 3/2007 | Chakiris et al. |
| 2007/0063052 A1 | 3/2007 | Chakiris et al. |
| 2007/0075132 A1 | 4/2007 | Kean |
| 2007/0090184 A1 | 4/2007 | Lockwood et al. |
| 2007/0094901 A1 | 5/2007 | Kibbe et al. |
| 2007/0203792 A1 | 8/2007 | Rao |
| 2007/0205134 A1 | 9/2007 | Dwyre |
| 2007/0215694 A1 | 9/2007 | Clegg |
| 2007/0246527 A1 | 10/2007 | Tang |
| 2007/0251994 A1 | 11/2007 | Kingsborough et al. |
| 2007/0252009 A1 | 11/2007 | Kingsborough et al. |
| 2008/0034624 A1* | 2/2008 | Bardolph et al. ......... 40/124.06 |
| 2008/0046283 A1 | 2/2008 | Graves |
| 2008/0095441 A1 | 4/2008 | Rosskamm et al. |
| 2008/0126212 A1 | 5/2008 | Cox |
| 2008/0154757 A1 | 6/2008 | Barros et al. |
| 2008/0217401 A1 | 9/2008 | Birkeland et al. |
| 2008/0217415 A1 | 9/2008 | Royer |

OTHER PUBLICATIONS

Photograph of Special Financing Offer, publicly available in Home Depot stores at least as early as Fall 2007 (1 page).

Photograph of a Kroger Prepaid Phone Card, publicly available at least as early as Holiday 2007 (1 page).

Photographs of Kroger Financial Products, publicly available at least as early as Holiday 2007 (1 page).

Photographs of Special Financing Offers, publicly available in Sam's Club stores as least as early as May 2007 (1 page).

Photographs of Gifting Products, publicly available in Walgreens stores at least as early as Holiday 2007 (1 page).

Photographs of Gifting Products, publicly available in Walgreens stores at least as early as Feb. 2007 (1 page).

Photograph of a Financial Product, publicly available in Wal-Mart stores at least as early as Holiday 2007 (1 page).

* cited by examiner

US 8,657,197 B2

ACCOUNT APPLICATION PRODUCT, ASSOCIATED PACKAGE AND METHOD FOR PROCESSING AN ASSOCIATED APPLICATION

CROSS-REFERENCE TO RELATED APPLICATION

This application is a continuation of and claims priority under 35 U.S.C. §120 to U.S. patent application Ser. No. 12/572,817, filed Oct. 2, 2009, now U.S. Pat. No. 8,322,619, issued Dec. 12, 2012, which is incorporated herein in its entirety.

BACKGROUND OF THE INVENTION

Financial products and/or accounts such as credit, debit, loan and insurance products have long been provided to consumers. These financial products generally are only available to consumers following completion and approval of an application to receive the products and/or services associated with such products. At times, the typical paper-based application process can be confusing and intimidating to consumers who are not familiar with the associated terminology, paperwork, etc. In recent years, offers to apply for such products have been verbally communicated to consumers while they are at a point-of-sale terminal in a retail store. While it often saves time and is less confusing to apply for financial products at the point-of-sale terminal, many consumers would prefer to contemplate such offers at their own initiative and speed rather than under any time pressures, whether real or imagined, imposed merely by being at a point-of-sale terminal.

SUMMARY OF THE INVENTION

One aspect of the present invention relates to an account application product including a package, an account identifier and a terms sheet. The package includes a first panel extending from a free edge to a first fold line, a second panel extending from the first fold line away from the first panel to a second fold line, and a third panel extending from the second fold line away from the second panel. The first panel is folded back along the first fold line toward a first surface of the second panel to define a storage area between the first panel and the second panel. The third panel is folded forward along the second fold line toward a second surface of the second panel. The account identifier indicates an account associated with the account application product and is configured to be machine readable by a point-of-sale terminal. The terms sheet is selectively stored in the storage area and includes printed terms for the account associated with the account application product. Other packaged products and associated methods are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
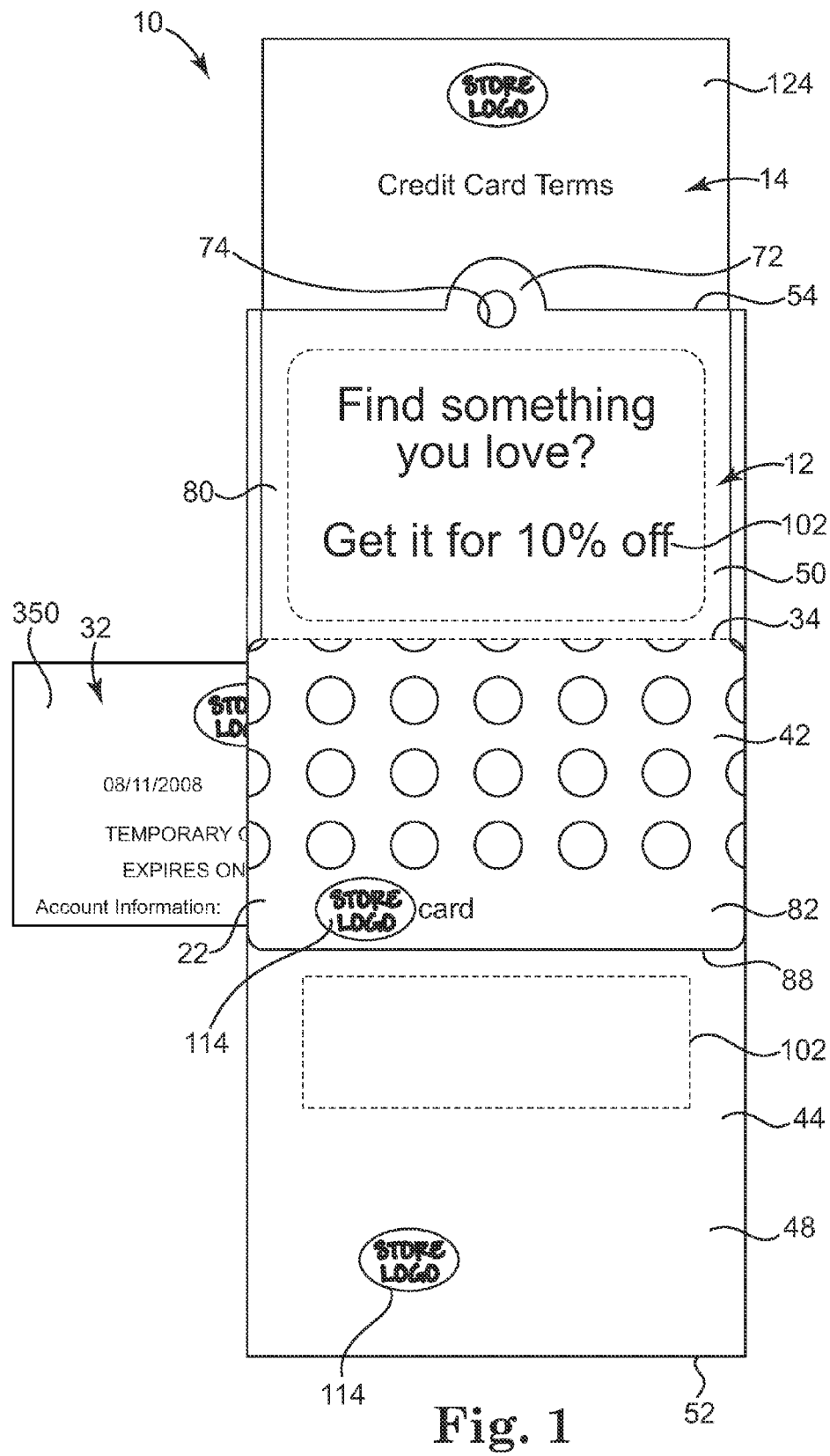
FIG. 1 is a front view illustration of an account application product including package in a folded position, a partially removed terms sheet and a partially removed temporary card, according to one embodiment of the present invention.

The following detailed description of the invention is merely provides example embodiments and is not intended to limit the invention or the application and uses of the invention. Furthermore, there is no intention to be bound by any theory presented in the preceding background of the invention or the following detailed description of the invention.

A tangible account application product is provided associated with a financial account such as a credit card, debit card, loan, insurance policy, etc. In one embodiment, the tangible product is more robust than a brochure or pamphlet and is configured to be displayed on a support rod or other support within a product display of a retail store. In one example, display of the account application product is provided near other for-sale merchandise that may encourage a consumer to apply for the associated account. For instance, where the account application product is associated with a credit card or loan, the account application product may be displayed in a retail setting in close proximity to big ticket merchandise, e.g., televisions, cameras, etc. As such, a consumer is encouraged to apply for the credit card to facilitate paying for the desired big ticket merchandise. Such cross promotion is enhanced where the account application product includes a discount that becomes available when an associated application is completed, for example, 10% off at the retail setting when the credit application is completed and/or approved.

In one embodiment, the account application product further facilitates this process by including a machine readable indicator that when scanned or otherwise read at the point-of-sale terminal in the retail setting automatically initiates the electronic application process at the point of sale. The machine readable indicator may also provide the retailer with information regarding where in the retail setting the account application product was displayed, which is useful in evaluating the display placements of the account application product that result in either a high or low rate of completed applications. Such evaluation assists the retailer in placing future account application products in areas that are more likely to yield higher application rates. The evaluation information also may provide data regarding sales of retail for-sale merchandise placed in close proximity to the account application products to determine if the account application products have any impact on the number of sales for such high ticket or other auxiliary for-sale merchandise.

In one example, the account application product contains all account information that a consumer may wish to peruse before applying for the account. In this manner, a consumer may review the account application product in the aisle or other placement in the product display or otherwise at their leisure without the pressure of a retail employee or other salesman waiting for their decision. If the consumer decides to apply for the product, the consumer brings the account application product to the point of sale where the electronic application process can generally be completed in short order. Therefore, the account application product is less burdensome on the consumer than other means for offering associated financial accounts.

Turning to the figures, FIGS. 1-7 illustrate an account application product 10 providing a tangible representation of an otherwise at least partially intangible product such that account application product 10 can be displayed in a retail store promoting the intangible financial product. The at least partially intangible product is an account, which generally requires a consumer to fill out an application before the account or any final representation thereof will be provided to the consumer. For example, the account may be a financial account such as a credit account, a debit account, a loan account, an insurance policy, etc. In one embodiment, account application product 10 includes all the necessary data to substantially automatically initiate an electronic application process when account application product 10 is presented at a point-of-sale terminal in a retail setting.

Figure 3:
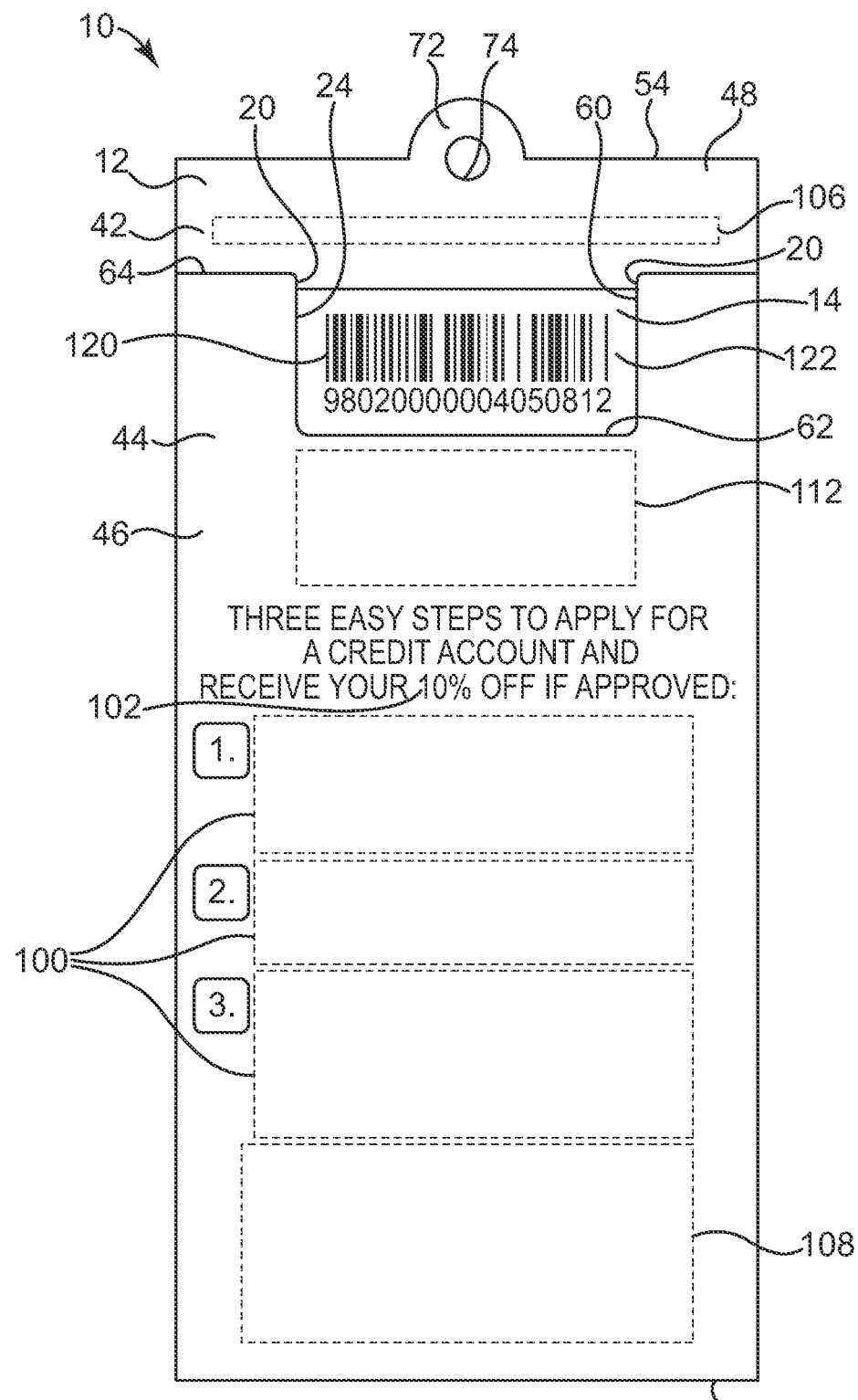
FIG. 3 is a rear view illustration of the account application product of FIG. 1 with the terms sheet and the temporary card both slid into place, according to one embodiment of the present invention.
Figure 4:
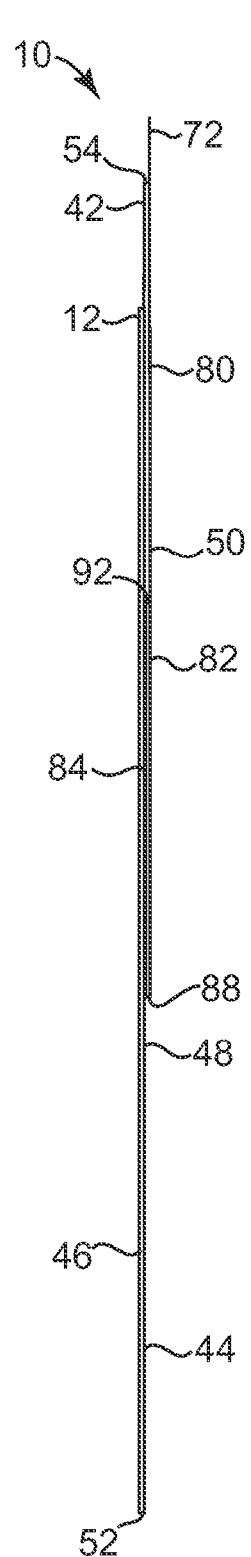
FIG. 4 is a left side view illustration of the package of FIG. 1, according to one embodiment of the present invention.
Figure 5:
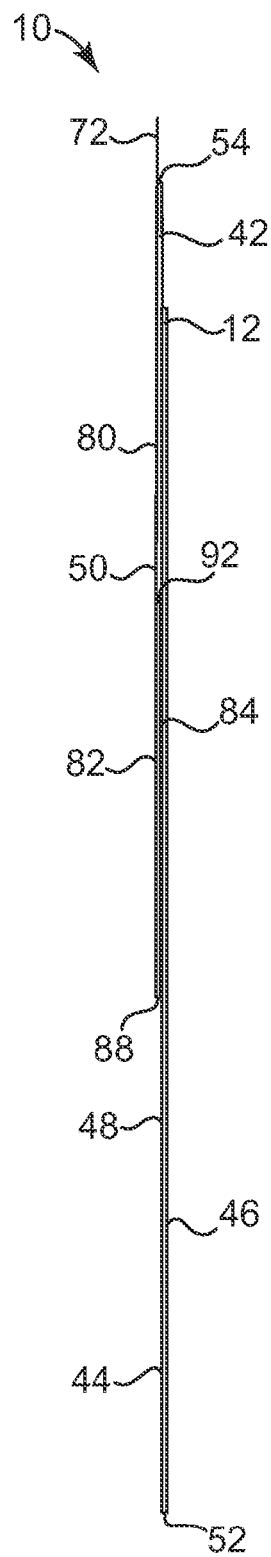
FIG. 5 is a right side view illustration of the package of FIG. 1, according to one embodiment of the present invention.
Figure 6:
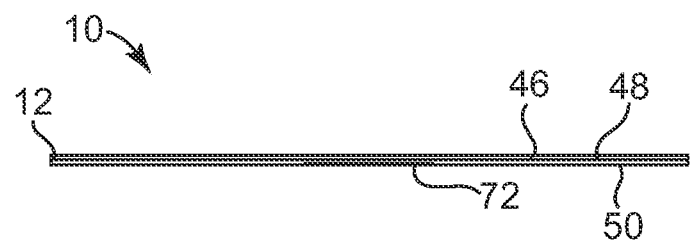
FIG. 6 is a top view illustration of the package of FIG. 1, according to one embodiment of the present invention.
Figure 7:
FIG. 7 is a bottom view illustration of the package of FIG. 1, according to one embodiment of the present invention.

In one embodiment, account application product 10 includes a carrier or package 12 and a terms sheet 14 (FIGS. 1 and 3). Package 12 is configured to support and, in one embodiment, substantially enclose terms sheet 14. Although package 12 may have any one of a variety of suitable configurations, in one embodiment, package 12 includes one or more of a terms pouch or terms pocket 20 (FIG. 3) and a temporary card sleeve 22. Pocket 20 is sized and shaped to define a storage chamber or area 24 (generally indicated in FIG. 3) such that pocket 20 is configured to readily and selectively receive terms sheet 14. Terms sheet 14 may be single sheet in total or may be one sheet of a plurality of sheets joined together to form a booklet, pamphlet, etc. or provided as a plurality of loose leaf sheets. Terms sheet 14 includes term details regarding the associated account. For example, with respect to an account application product 10 relating to a credit account, the terms sheet includes information regarding fees, interest rates, reasons for termination, repayment details, etc. When folded into or otherwise formed in a suitable size, terms sheet 14 is configured to easily slide in and out of pocket 20.

In one embodiment, package 12 additionally includes temporary card sleeve 22. Sleeve 22 defines a thin cavity 30 configured to selectively receive and store a temporary card 32, etc. associated with the account as will be further described below. For example, a temporary card 32 may provide access to the account until a permanent card or other access mechanism is delivered to the consumer. In one example, an opening to sleeve 22 is formed along a longitudinally extending edge of package 12. In one embodiment, temporary card sleeve 22 is perforated along a boundary line 34 between sleeve 22 and the remainder of account application product 10 such that sleeve 22 may be separated from the remainder of account application product 10 and placed within a wallet of the consumer.

Figure 8:
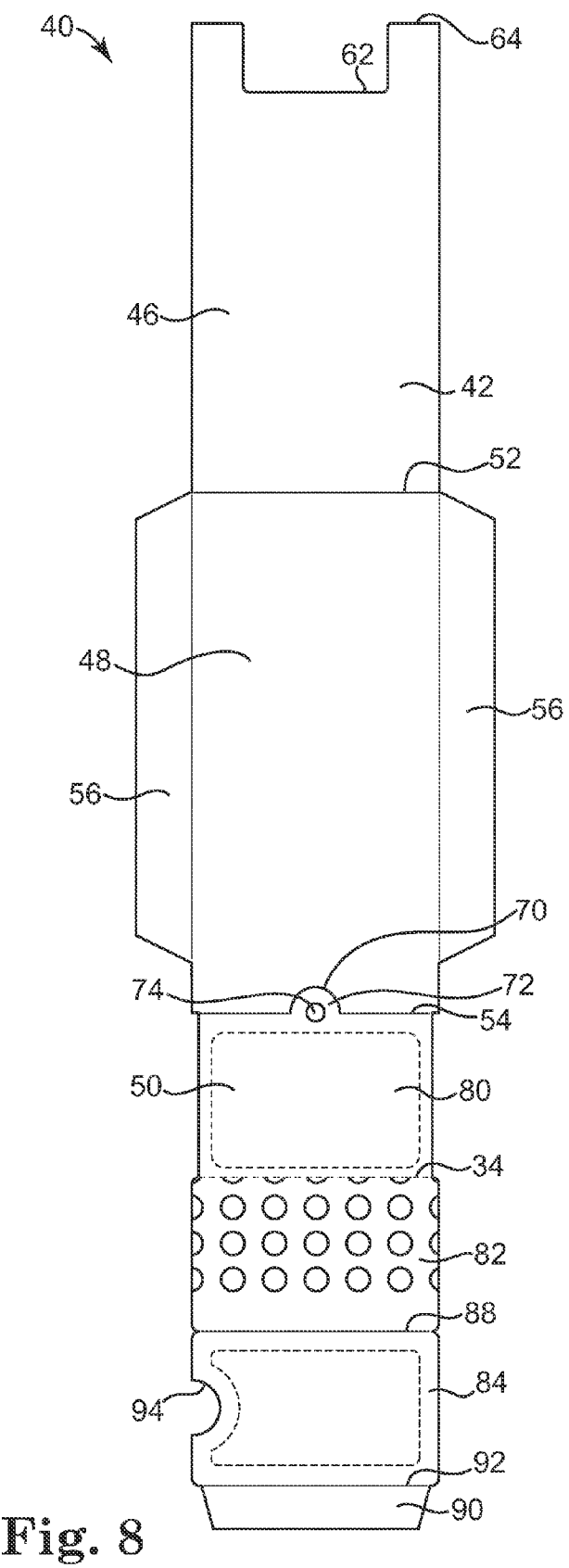
FIG. 8 is a rear view illustration of a blank configured to be folded into a package included in the account application product of FIG. 1, according to one embodiment of the present invention.

In one embodiment, package 12 includes a single layer or multiple layers of paper or plastic material, for example, generally in the form of a relatively stiff but bendable/flexible card. In one embodiment, package 12 is formed of paperboard, chipboard or cardboard. Use of other materials and/or composites is also contemplated. In one example, package 12 is formed from a blank 40 of planar material (i.e., single contiguous piece of material). One example of blank 40 configured to be folded into package 12 to define pocket 20 and sleeve 22 is illustrated in FIG. 8.

Blank 40 is substantially planar and defines a first major surface 42 and a second major surface 44 (portions illustrated in FIGS. 1-3) opposite first surface 42. Blank 40 defines a first panel 46 (FIGS. 2 and 3), a second panel 48, and a third panel 50, wherein the second panel 48 extends between first panel 46 and third panel 50. In one embodiment, in the unfolded form, first panel 46 and third panel 50 are only connected to one another via second panel 48. In one example, first panel 46 and second panel 48 are separated by a first boundary or fold line 52, and second panel 48 and third panel 50 are separated by a second boundary or fold line 54. In one embodiment, first panel 46 and second panel 48 each directly abut opposite sides of fold line 52, and second panel 48 and third panel 50 each directly abut opposite sides of fold line 54.

First panel 46 and second panel 48 have substantially similar widths and are configured to be folded relative to one another to define pocket 20 with storage area 24 therebetween. For instance, as illustrated in FIG. 8, first panel 46 is folded along fold line 52 to place first surface 42 of first panel 46 to face first surface 42 of second panel 48.

In one embodiment, one or both of first panel 46 and second panel 48 include side flanges 56 extending along a substantial length thereof. Flanges 56, which, in one example, are positioned opposite one another along second panel 48, are folded toward one another prior to folding first panel 46 relative to second panel 48. As such, where flanges 56 are formed adjacent second panel 48, second surface 44 as defined by flanges 56 is adhered or otherwise coupled to portions of first surface 42 defined by first panel 46. In one example, flanges 56 are alternatively or additionally defined along the edges of first panel 46 and are adhered or otherwise coupled to second panel 48 as will be apparent to one of skill in the art upon reading the present application. In this manner, storage area 24 is defined between first panel 46, second panel 48 and flanges 56 such that storage area 24 is generally only readily accessible through an opening 60 defined opposite first fold line 52. In one example, first panel 46 defines a smaller longitudinal dimension (i.e., the dimension extending up and down in FIG. 8) than second panel 48. As such, when folded to define pocket 20, a free edge 64 of first panel 46, and therefore, opening 60, is formed in a position spaced from second fold line 54 as illustrated with references to FIGS. 1 and 2. In the above-described configuration, pocket 20 generally extends in the longitudinal direction (i.e., items are placed in pocket 20 by sliding them into opening 60 and into storage area 24 in the longitudinal direction). In one embodiment, opening 60 generally extends laterally (i.e., side to side in the orientation illustrated in FIG. 8).

In one example, first panel 46 defines a cutout 62 shaped in any suitable configuration (e.g., a rectangular-shaped cutout 62) and extending from a free edge 64 of first panel 46 toward first fold line 52. In one embodiment, cutout 62 is laterally centered along free edge 64 and/or extends along over half a lateral width of free edge 64.

Third panel 50 is configured to be folded along second fold line 54 into the page as illustrated in FIG. 8 (out of the page as illustrated in FIG. 3) relative to second panel 48 such that third panel 50 forms a flap extending over at least a portion of second surface 44 defined by second panel 48.

In one example, cut or slit 70 is formed extending from second fold line 54 into an interior of one of second panel 48 and third panel 50 (second panel 48 as illustrated in FIG. 8) and back to second fold line 54 to define a tab 72. Blank 40 defines an aperture 74 laterally centered within tab 72. In such a configuration, when blank 40 is folded along second fold line 54, tab 72 remains coupled with and extends substantially planar with respect to third panel 50, while the remainder of second panel 48 is folded down away from second fold line 52 as illustrated with collective reference to FIGS. 1-3 and 8. Package 12 is configured to be hung on a support arm or hook (not shown) via aperture 74 as will be apparent to those of skill in the art upon reading the present application.

Figure 2:
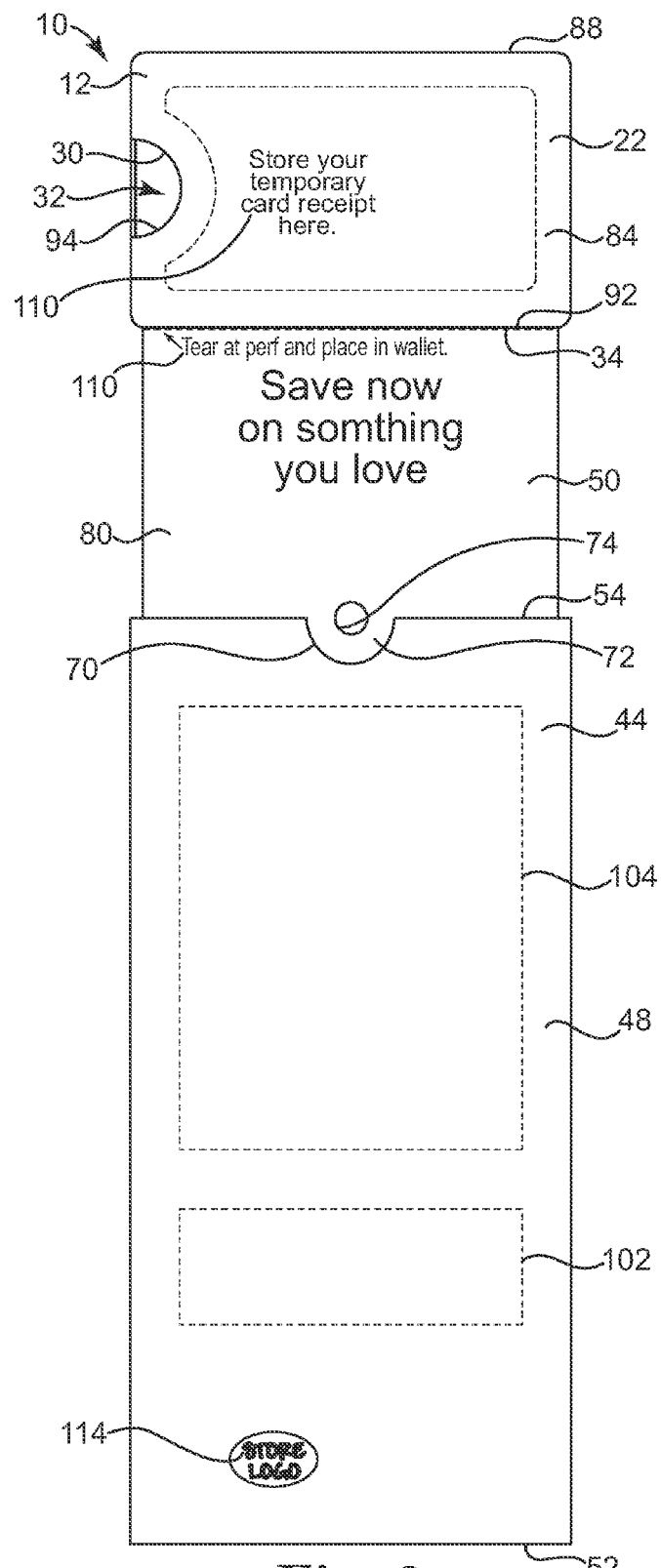
FIG. 2 is a front view illustration of the account application product of FIG. 1 with the package in an unfolded position and the terms sheet and the temporary card both slid into place, according to one embodiment of the present invention.

In one embodiment, third panel 50 includes a first portion 80, a second portion 82 and a third portion 84 (FIGS. 2 and 8). First portion 80 extends from second fold line 54, second portion 82 extends from first portion 80 opposite and away from second fold line 54, and third portion 84 extends from second portion 82 opposite and away from first portion 80. In one example, boundary line 34, which, in one embodiment, is perforated and laterally extends between and, in one embodiment, abuts each of first portion 80 and second portion 82. In one example, a third fold line 88 laterally extends between and, in one embodiment, abuts each of second portion 82 and third portion 84.

A laterally extending tab 90 is defined along a fourth fold line 92, which is defined adjacent third portion 84 opposite third fold line 88. When configuring blank 40 for use as package 12, third panel 50 is folded along third fold line 88 and fourth fold line 92 into the page relative to FIG. 8. As such, first surface 42 of flange interacts with and is coupled to second surface 44 of second portion 82 to define thin cavity 30 between second portion 82 and third portion 84. As such, a portion of third panel 50 extending on a side of perforated line 86 opposite second fold line 54 (i.e., second portion 82, third portion 84 and lateral tab 90) defines sleeve 22 (additionally see FIG. 2). In one embodiment, the longitudinally extending edges of sleeve 22 are left open (i.e., are not sealed). In one embodiment, only one of the two longitudinally extending edges of sleeve 22 is left open to provide access to thin cavity 30. As described above, sleeve 22 generally extends in the lateral direction (i.e., items are slid into sleeve 22 in a lateral direction). In one embodiment, sleeve 22 generally extends in a direction substantially perpendicular to pocket 20.

In one embodiment, one or both of second portion 82 and third portion 84 includes a curvilinear or other cutout 94 extending from an opening, more specifically, a longitudinally extending edge defined by third panel 50. Cutout 94 is configured to provide easier access to temporary card 32 when it is stored in sleeve 22 as will be further described below.

In one embodiment, when third panel 50 is folded to define sleeve 22, third panel is longitudinally shorter than second panel 48. As such, when second panel 48 is folded such that second surface of first portion 80 faces second surface of second panel 48, a portion of second surface of second panel 48 is visible from a front of package 12 as illustrated in FIG. 1.

Prior to being folded, blank 40 is printed with various indicia configured to readily provide consumers with general information regarding one or more of the type of account associated with the product, any cost, account terms, account features, incentives, processing directions, etc. Such indicia may be configured to promote the application-based product/account associated with package 12 and/or to facilitate an employee in processing the account application product 10 at the point-of-sale terminal. Indicia may be printed to one or both surfaces 42 and 44 and to all or any combination of panels 46, 48 and 50.

For example, package 12 includes one or more of product details 100, incentive details 102, reward details 104, term identifiers 106, legal notices 108, consumer directions 110, processing directions 112 and brand indicia 114 many of which are indicated as dashed boxes for clarity in the illustrations. Product details 100 include information identifying that account application product is associated with a financial account and information regarding that account. For example, product details 100 may identify that account application product 10 is associated with a credit account (e.g., closed or open loop) and may provide information regarding specifics of the account.

Incentive details 102 provide the consumer with an offer for a discount, free item or other incentive encouraging the consumer to apply for the associated account. For example, incentive details 102 may advertise that the consumer will get 10% off a purchase, item or day's purchases when the associated account is applied for and/or when the consumer's application is approved. More particularly, incentive details 102 may state "Applying for this credit card could save you 10% now and reward you over and over again."

While information regarding rewards may be included in incentive details 102, in one embodiment, reward details 104 are additionally or alternatively provided on packaging 12. Reward details 104 outline the reward structure, if any, associated with the account. For example, reward details 104 may provide information regarding cash back programs, accumulated points to earn discount certificates or other items, charitable donations based on account use, associated frequent purchase discounts (e.g., receive a discount upon having ten prescriptions filled at a particular pharmacy or chain of pharmacies), etc. In this manner, both incentive details 102 and reward details 104 tout benefits to the consumer if the consumer applies for and is approved for the account associated with the account application product 10. As such, incentive details 102 and reward details 104 promote the associated account while informing the consumer regarding details of the account.

Term identifiers 106 indicate to the consumer that terms sheet 14 is included as part of account application product 10. For example, term identifiers 106 may by positioned on packaging near opening 60 (FIG. 3) and state "Please read this important information about the credit account before applying" or something similar and may be provided along with an arrow or other item pointing to terms sheet 14. As such, merely by reviewing account application product 10, a consumer is alerted to all the terms for the account without requiring prompting by a salesman or other individual. As such, the pressure associated with consumer evaluation of the associated account is greatly decreased.

Legal notices 108 include any legal disclaimers or clarifications that the account provider or retail store wishes to indicate on the outside of package 12. In one embodiment, legal notices 108 indicate that some restrictions may apply to associated application incentives, may point the consumer to the terms sheet 14 for more details regarding rewards or incentives identified by incentive details 102 and reward details 104, respectively and/or identify the consumer's access that a consumers access to the associated account is subject to credit or application approval.

Consumer directions 110 instruct a consumer regarding how to use account application product 10. For example, consumer directions 110 may instruct the consumer to (1) take the card to the checkout to complete the electronic application process, (2) receive an incentive if the application is approved and (3) receive a temporary or permanent card associated with the account at the point of sale for permanent use or use until a permanent card is mailed to the consumer. In one embodiment, consumer directions 110 additionally or alternatively provide information regarding use of packaging 10. For example, consumer directions 110 instruct a consumer that temporary card 32 can be stored in sleeve 22 and/or that sleeve 22 can be easily removed from the remainder of package 12 without the use of tools by tearing package 12 along perforated boundary line 34.

Processing directions 112 provide instructions for a retail store employee or other individual at the point of sale regarding how to process account application product 10 to facilitate the account electronic application process. For instance, in one embodiment, processing directions 112 instruct the retail store employee to scan or otherwise read an identifier associated with the account, to point out terms sheet 14 and/or other details to the consumer, and to complete the electronic application process. Other processing directions will be apparent to those of skill in the art upon reading this application.

Brand indicia 114 identify a retail entity, account issuer, department or other identifier regarding who is servicing the account and/or who will facilitate the electronic application process. It should be understood that indicia described herein may or may not all be included on package 12 and that other indicia that will be apparent to those of skill in the art upon reading the present application may also be provided on package 12.

To facilitate activation of a service plan, in one embodiment, account application product 10, for example, package 12 or terms sheet 14, includes an application identifier 120 (FIG. 3) readily readable by a point-of-sale terminal, such as a kiosk, cash register, personal computer, etc. In one embodiment, application identifier 120 is provided in the form of a bar code, magnetic strip, smart chip, radio frequency identification (RFID) device, etc. In one example, application identifier 120 is included on a back surface 122 (FIG. 3) of terms sheet(s) 14 while a front surface 124 (FIG. 1) of terms sheet(s) 14 abuts second panel 48. In one embodiment, account identifier 120 is more specifically provided near a top of terms sheet 14 such that account identifier 120 is viewable or otherwise accessible through cutout 62 in first panel 46 for ease of location and scanning at the point-of-sale terminal.

In one example, upon reading application identifier 120, application identifier 120 informs the point-of-sale terminal that a specific electronic application process should be initiated. Application identifier 120 may additionally provide the point-of-sale terminal with information regarding where account application product 10 was displayed in the retail store, what items account application product 10 was displayed near, etc. In one embodiment, application identifier 120 is substantially unique such that it not only identifies the type of account associated with account application product 10, but actually identifies a unique, individual account assigned to the particular account application product 10. In one embodiment, application identifier 120 identifies that an application process should be initiated and indicates where in retail store account application product 10 was displayed, but it does not indicate a specific, individual account. As such, the electronic application process is completed with respect to the identified, individual account populating the identified account with consumer information and other details.

Figure 9:
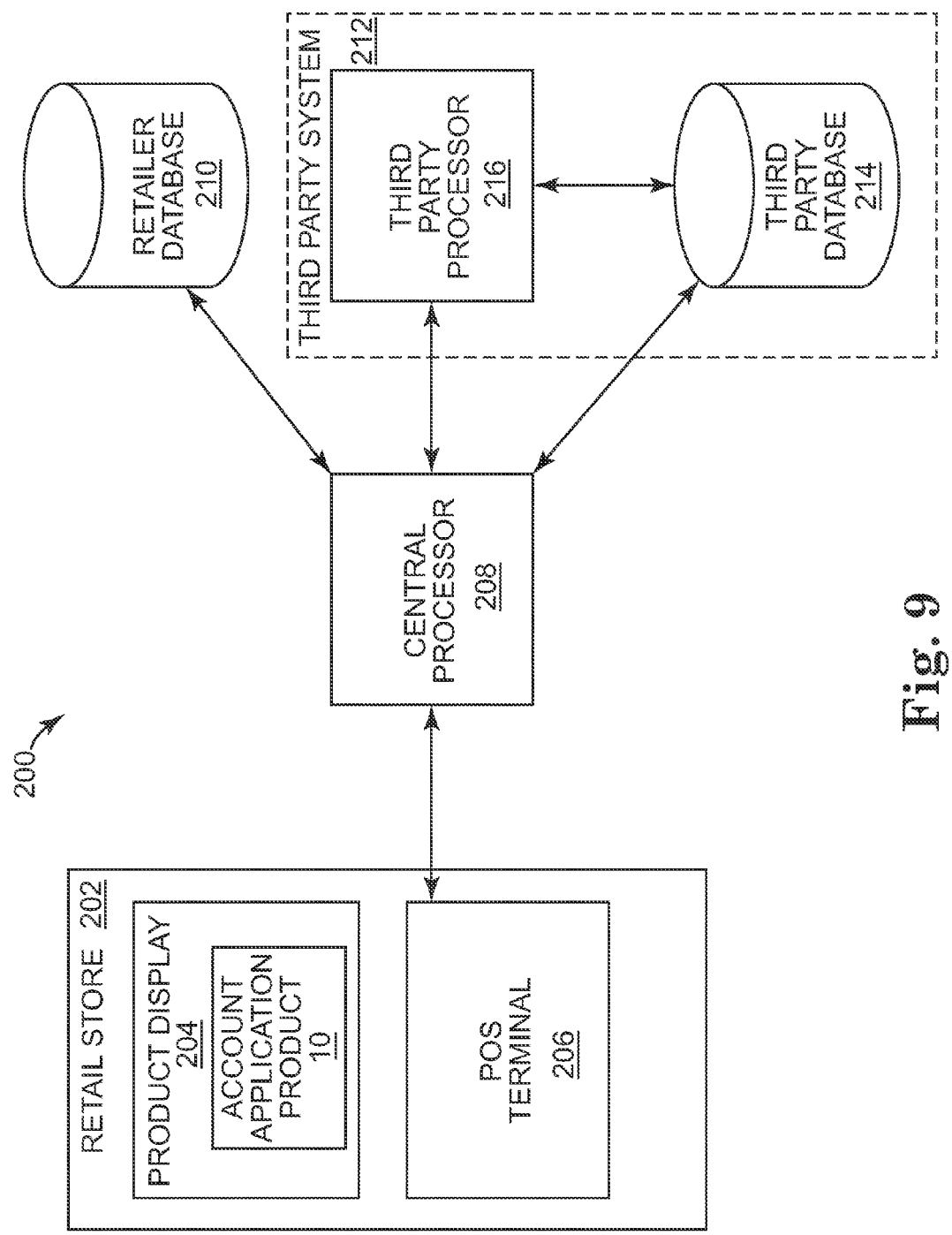
FIG. 9 is a diagram of a system associated with the account application product of FIG. 1, according to one embodiment of the present invention.

FIG. 9 is a schematic block diagram illustrating a system 200 for facilitating an electronic application process using account application product 10, according to one embodiment of the invention. In one embodiment, system 200 includes a retail store 202, a central processor 208, a retailer database 210 and a third party system 212. Retail store 202 includes one or more product display 204 in which for-sale merchandise is displayed for consumers to view and consider for purchase. For example, retail store 202 may include an electronics department with relatively high-end merchandise such as televisions, cameras, DVD players, etc. placed for visual inspection by consumers.

In one embodiment, account application product 10 is displayed in product display 204 along side of or otherwise in close proximity to the merchandise in a manner allowing for cross promotion of the merchandise and account application product 10. For example, account application product 10 may be hung near or displayed on a stand or other device near selected merchandise. In one embodiment, display of account application product 10 near for-sale merchandise, especially high-end merchandise, makes any incentive offered by account application product 10 seem more tangible, and therefore, more appealing to the guest. For instance, wherein the incentive is for 10% of an entire purchase made at the time of application and a television is offered for sale at a price of $1,000, the guest easily can assign the incentive with a tangible dollar amount, in this case $100.

Retail store 202 additionally includes a point-of-sale (POS) terminal 206. POS terminal 206 is any terminal where a purchase can be made and, in one embodiment, is one of a plurality of POS terminals 206. In one embodiment, POS terminal 206 is one of a cash register, sales kiosk, self checkout kiosk, personal computer or other suitable personal device in the case of internet-based purchases, etc. In one embodiment, POS terminal 206 is included within or is in communication with a website provided by a retail store 202 or a retailer chain. Although primarily described below with respect to a POS terminal 206 in a brick-and-mortar retail store 202, upon reading this application one of skill in the art will recognize how the described configuration can be modified to apply to an internet-based POS terminal 206.

POS terminal 206 is in communication with central processor 208, which may be associated with retail store 202, account issuer or other associated party. As primarily described in the examples below, central processor 208 is associated with retail store 202. Central processor 208 is configured to, upon query by POS terminal 206, process the application associated with account application product 10. Central processor 208 is in communication with retailer database and/or third party system 212. POS terminal 206, central processor 208, retailer database 210 and third party system 212 may be in electrical communication with one another in any one or more suitable ways. In one embodiment, POS terminal 206, central processor 208, retailer database 210 and third party system 212 are each at least partially coupled to one another via a network (generally indicated by the arrows illustrated in FIG. 9) such as an internal retailer or plan administrator network, external network (i.e., the Internet) or a combination network including internal and external networks in communication with one another.

Central processor 208 is any suitable processor configured to perform an automated credit application processing routine and to provide a decision regarding whether or not to approve the consumer's application. Central processor 208 may be maintained solely by the retailer and/or may be provided by another party as will be apparent to those of skill in the art upon reading the present application. Although illustrated as a single central processor 208, it should be understood that central processor may be collectively formed by a plurality of processors.

In one embodiment, POS terminal 206 is configured to collect information from account application product 10 and the consumer (either at its own direction or the direction of central processor 208 following reading of application identifier 120 from account application product 10) and to forward such information to central processor 208. Central processor 208 is configured to process the information according to predefined rule sets regarding evaluation of consumers for credit or other account approval. Such rule sets may include verification of information provided by POS terminal 206 and/or analysis of the credit worthiness of the consumer. In performing the analysis, in one example, central processor 208 queries and/or parses internal retail database(s) 210 and/or third party system(s) 212.

Internal retail database 210 may include information regarding the consumer that has been collected by the retailer in past interactions with the consumer (e.g., whether past credit inquiries have been made and/or approved and whether any prior checks provided to the retailer have bounced). Such information may provide central processor 208 with enough information regarding the consumer to make a quick determination regarding whether they should be approved for credit, etc. based on the predefined rule sets.

In one example, upon initial review or following review of retailer database 210 in which a consumer appears to be credit worthy, central processor 208 is configured to query third party system 212 to collect additional information regarding the consumer. Third party system 212 is any suitable system configured to inform a credit or similarly based application decision process. In one embodiment, third party system 212 is a credit bureau, bank or other similar institution. Depending upon specifics of third party system 212, central processor 208 may directly communicate with one or more third party database 214 to mine for desired information regarding the consumer (e.g., credit score, past credit delinquencies, etc.). In one embodiment, central processor 208 additionally or alternatively communicates with third party system 212 via third party processor 216, which, in turn, accesses third party database 214. In one example, third party processor 216 mines information from third party database 214 and/or applies predefined parsing rules (e.g., to provide a credit score) to the information before passing along information to central processor 208.

Once information is received from retailer database 210 and/or third party system 212, central processor 208 parses the information using predefined rules to determine whether or not to approve the consumer's application for credit, debit, loan, insurance, etc. In one example, the decision is simply to approve or decline the consumer. In one example when the consumer is not approved, the decision may be to offer the consumer a slightly downgraded financial account (e.g., a secured card) rather that the originally applied for account (e.g., a non-secured credit card). The decision is then communicated back to the consumer via POS terminal 206. In one example, rather than providing the consumer with a decline notice at POS terminal 206, the consumer may be notified that an immediate decision cannot be made and that the consumer will be notified regarding the decision by mail. By providing a decline decision via mail, a consumer can be spared any embarrassment associated with being informed of the decline at the more public point of sale and/or more details regarding the decline can be discretely communicated to the consumer.

In one embodiment, a decision may also be deferred at POS terminal 206 if retail store 202 or central processor 208 detects fraud and requires additional time to follow-up to verify the fraud or determine that no fraud is present. In such a case, the guest may be informed of application approval at a later time (e.g., by mail) if fraud was originally suspected, but is later proven to be a false suspicion.

Figure 10:
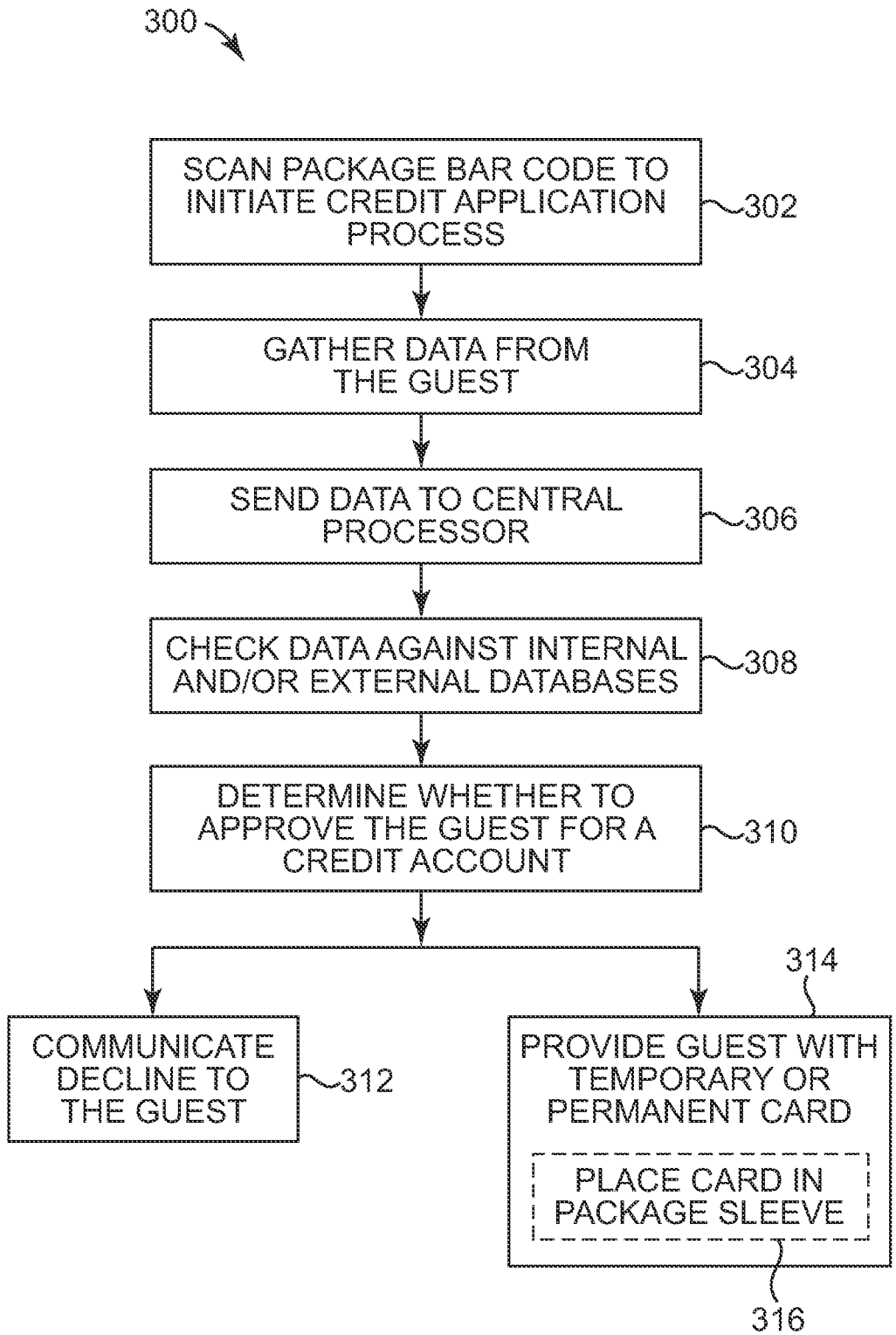
FIG. 10 is a flow chart illustrating a method of processing an application associated with an account application product, according to one embodiment of the present invention.

FIG. 10 illustrates a method 300 of processing an application according to one embodiment of the present invention. After the consumer or guest has perused account application product 10 in a location positioned away from POS terminal 206 (e.g., near product display 204 or in other locations within retail store 202) and has presented account application product 10 to an employee at POS terminal 206 or other suitable kiosk, etc., at 302, a bar code or other application identifier 120 is scanned or otherwise entered into POS terminal 206. Entry of application identifier 120 automatically causes POS terminal 206 to enter an account application sequence. The application is substantially automatically initiated when merely reading the application identifier 120 causes the POS terminal 206 to begin the electronic application process or sequence without otherwise requiring an employee, the consumer or other individual to prompt the POS terminal 206 to begin the electronic application process or sequence.

In one embodiment, application identifier 120 also provides POS terminal 206 with information regarding where account application product 10 was displayed in the store or provide other information to inform retail store 202 regarding what placements of account application product 10 generally yield high levels of consumer interest and application and/or what placements of account application product 10 generally yield low levels of consumer interest. In one example, application identifier 120 provides POS terminal 206 with the identification of a particular predefined account or application number and electronic application processing is performed linked to that specific account or number.

When in application mode, at 304, POS terminal 206 prompts the guest to enter data for use in completing the electronic application process. In one example, POS terminal 206 prompts the guest directly via a guest interface or indirectly via a retail store employee. Data may be entered in any of a variety of manners as will be apparent to those of skill in the art upon reading the present application. For example, a driver's license or prior credit card of the guest may be scanned into POS terminal 206 to substantially automatically provide at least some of the information from the guest. Data gleaned from the driver's license, credit card and/or requested by POS terminal 206 includes any one or more of the following items: guest social security number, guest data of birth, guest phone number(s), guest or household income level, agreement/authorization to perform a credit check, guest signature and other data. Once POS terminal 206 has gathered or during gathering data from guest, POS terminal 206 forwards such data to central processor 208 at 306.

At 308, central processor 208 reviews the gathered data in view of retailer database 210 and/or third party databases 214. Information may be gathered from databases 210 and 214 directly or via intermediate processors such as third party processor 216. At 310, data from the guest and databases 210 and 214 is parsed using predefined parameters to automatically determine whether or not the application should be approved. For example, where the account being applied for is a credit or loan product, central processor 208 parses all available information to determine if the guest is credit worthy and/or what level of credit or loan the guest is eligible to be offered. In one embodiment, if a decision is made to approve a guest's application, then additional decisions are also made such as what credit line or loan amount to approve, related percentage rates, reward availability, etc.

In one example, the decision at 310 may be more than merely a decline or approve decision. For example, the decision at 310 may include determinations regarding what level of account to approve the guest for such as whether to offer the guest open-loop or closed-loop credit, secured or unsecured credit, a particular level of insurance, etc.

If the central processor 208 decides to decline the guest's application, then at 312 the decision is communicated to the guest. In one example, the decision is sent from central processor 208 to POS terminal 206, and POS terminal 206 communicates the decision to the guest either directly or via the retail store employee. In one example, when the guest's application is declined, central processor 208 directs POS terminal 206 to inform the guest that the application is still pending and/or a decision is being deferred and that the guest will be informed via mail regarding the decision. If such a message is conveyed to the guest, generally central processor 208 will also initiate letter generation and sending processes to create and send a letter to the guest informing them of the decision not to approve the guest for credit and/or providing the guest with reasons for the decision.

If the guest's application is approved, then at 314, POS terminal 206 communicates the decision to the guest. In one example, once approved POS terminal 206 or another terminal associated therewith generates a permanent card or a temporary card associated with the approved account. In one example, the temporary card is provided to the guest in the form of a printout from POS terminal 206 and serves as a guest card for access to the associated account until a permanent card is provided to the guest such as through the mail.

Figure 11A:
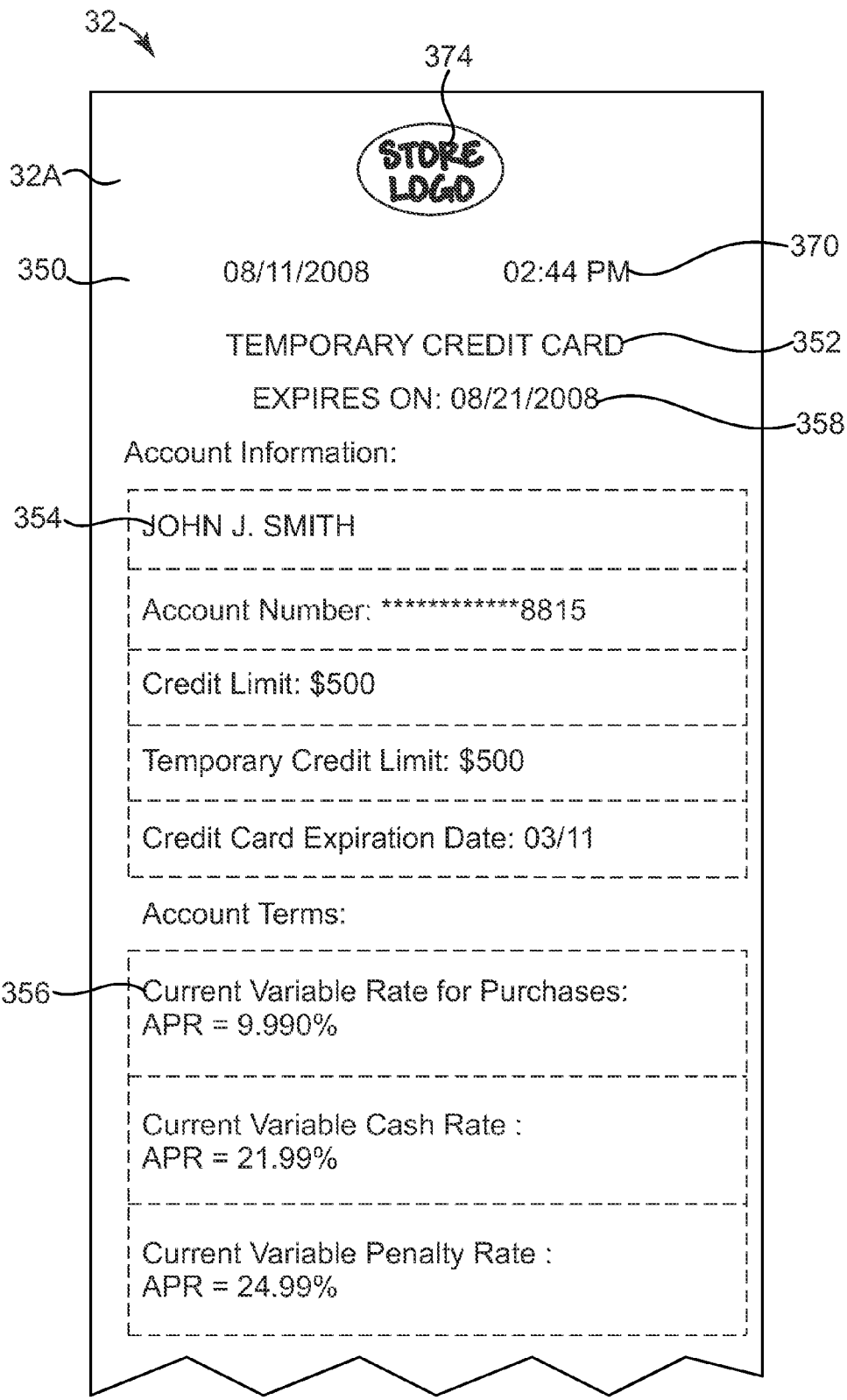
FIG. 11A is a front view of a top portion of a temporary credit card printed during the method of FIG. 10, according to one embodiment the present invention.
Figure 11B:
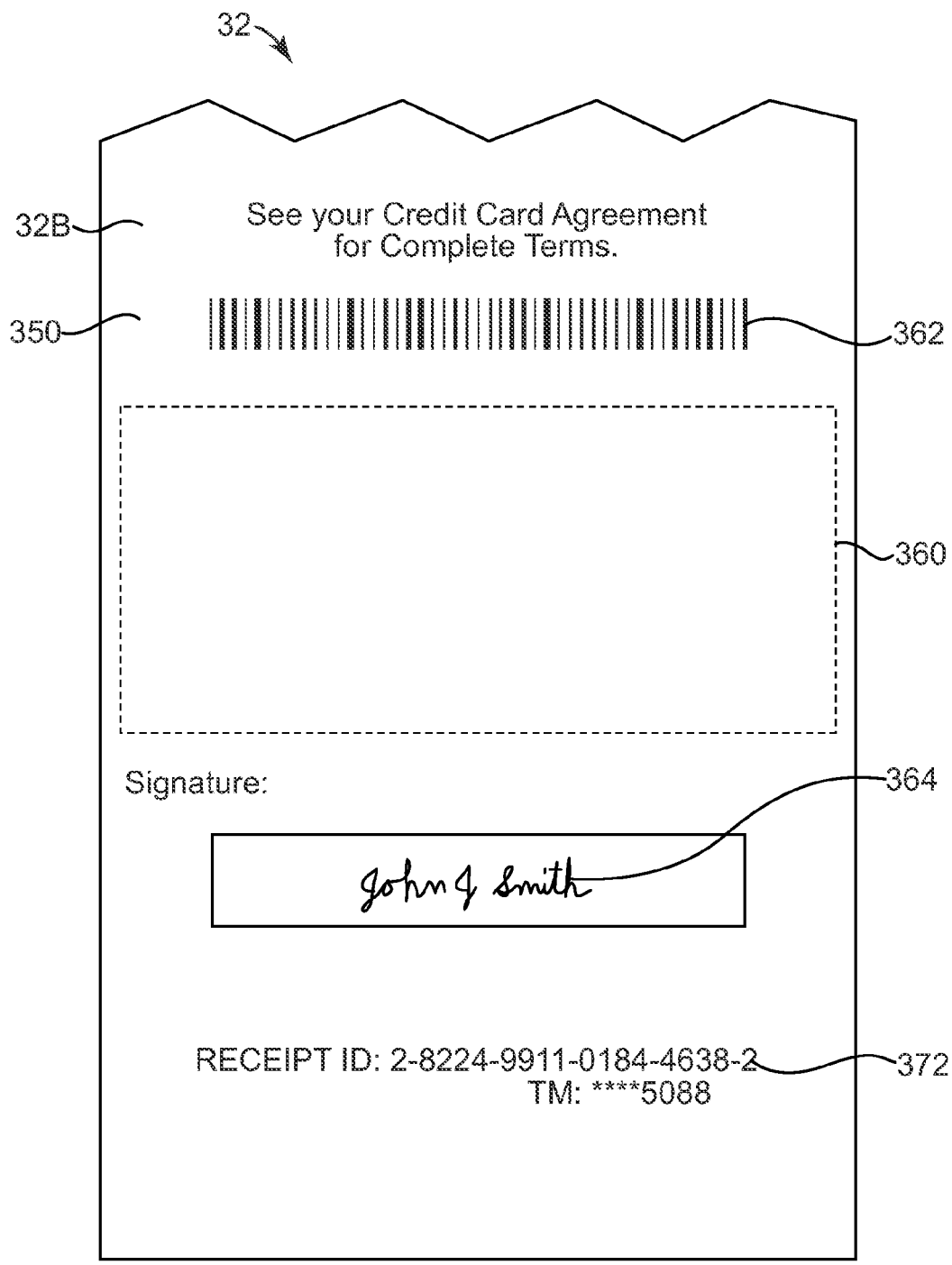
FIG. 11B is a front view of a bottom portion corresponding with the top portion of the temporary credit card as illustrated in FIG. 11A, according to one embodiment of the present invention.

FIGS. 11A and 11B respectively illustrate one example of a top 32A and a bottom 32B of temporary card 32 printed at POS terminal 206 relating to a credit account. Since temporary card 32 is printed at POS terminal 206, it is formed of any suitable paper 350. Paper 350 is printed to include various information such as temporary card identification 352, account information 354, rate terms 356, an expiration date 358 of temporary card 32, additional terms or notes 360, an account identifier 362, a reproduction 364 of the guest's signature as collected previously in method 300, a time stamp 370, receipt identification 372 and one or more brand identifiers 374.

Account information 354 and rate terms 356 provide the guest with a brief listing of important features of the awarded account. For example, for a credit account as illustrated in FIG. 11A, account information 354 includes the guest's name, a full or partial account number, a credit limit, a temporary credit limit (a credit limit available for use prior to receipt of the permanent card associated with the account), and a credit card expiration date. In one example, rate terms 356 include details regarding interest rates associated the account such as the current variable rate for purchases, the current variable cash withdrawal rate, current variable penalty rate, applicable late fees, etc. This data not only informs the consumer, but also may inform a store employee or POS terminal 206 regarding account details if temporary card 32 is present for use during a subsequent purchase transaction.

Account identifier 362 is any suitable machine readable identifier indicating the specific account associated with temporary card 32, for example, a bar code, a magnetic stripe or a radio frequency identification tag. Much of the data on temporary card 32 is provided to prevent fraud associated with the account. For example, account information 354, expiration date 358 an account identifier 362, signature reproduction 364, time stamp 370 and receipt identification 372 can all be used if necessary to verify any temporary card 32 presented at POS terminal 206 for redemption toward a purchase of goods and/or services to prevent or at least decrease fraud against retail store 202.

Returning to FIG. 10, upon providing temporary card 32 at 314, then, at 316, temporary card 32 may be folded or otherwise manipulated as needed and is slide into sleeve 22 for storage and safe keeping. In one example, sleeve 22 includes indicia corresponding with a look of a permanent card to be received by the guest at a future date. The sleeve 22 provides a safe environment to protect temporary card 32 from wrinkling or other damage and, in one embodiment, is sized and shaped similarly to a credit card or to otherwise conveniently fit within a wallet of the guest when it is removed from a remainder of package 12 (e.g., torn along perforated boundary line 34).

In one embodiment, in delivering temporary card 32 to the guest, POS terminal 206 informs the guest that temporary card 32 is only valid for a limited time (see expiration date 358) and that a permanent card should arrive in the mail prior to expiration date 358. In one embodiment, account application product 10 is otherwise offered with a temporary plastic card that is activated only after account approval in addition to or as an alternative to printed temporary card 32. A temporary plastic card would work similar to printed temporary card 32. In one example, no temporary card 32 is provided, but rather POS terminal 206 prints a permanent card or directs the guest to a separate guest services area of retail store 202 to receive the permanent card.

Figure 12:
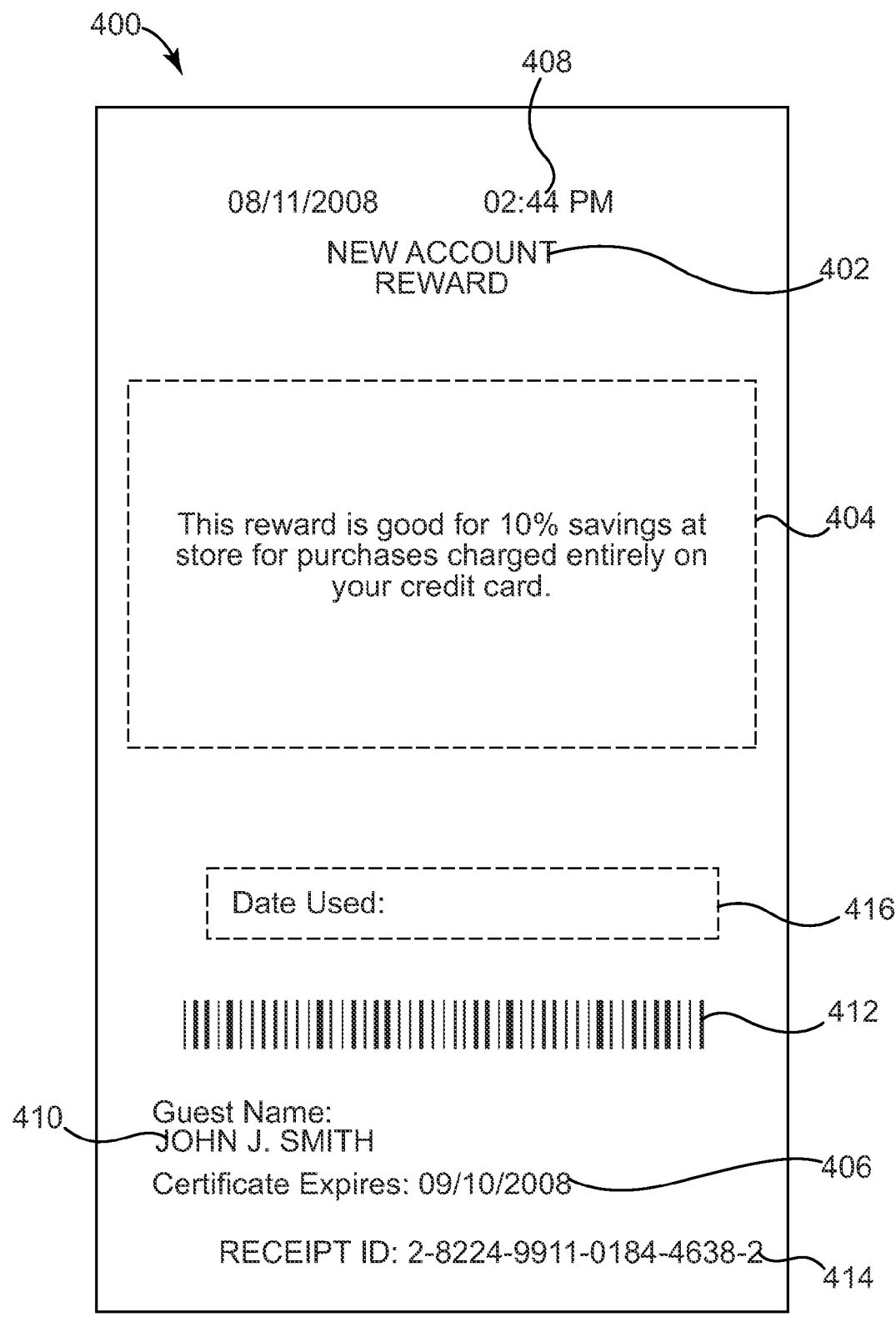
FIG. 12 is a front view of an incentive ticket optionally provided to a consumer in the method of FIG. 10, according to one embodiment of the present invention.

In one embodiment, at 314 (FIG. 10), POS terminal 206 also presents the guest with a coupon or other incentive redemption ticket 400, which may be printed by POS terminal 206. For example, where package 12 touts a discount or other reward to be provided to the guest upon application approval, that discount or other reward is provided as ticket 400, which can subsequently be redeemed for the discount or reward. FIG. 12 illustrates one example of ticket 400. In one embodiment, ticket 400 includes any one or more of the following: ticket identification 402, reward details 404, an expiration date 406, a time stamp 408, guest identification 410, reward identifier 412, receipt identification 414 and an area 416 for later writing the date on which ticket 400 is redeemed. In one example, ticket 400 includes a reward that encourages the guest to use their newly established account, e.g., provides a discount that is available only when a purchase is charged to the newly established account.

Reward identifier 412 is a machine readable identifier configured to provide reward and redemption details to POS terminal 206 when ticket 400 is presented for redemption. Expiration date 406, time stamp 408, guest identification 410, receipt identification 414 and area 416 are each included to provide means for verifying the authenticity of ticket 400 and to indicate any past redemption of ticket 400 that may prohibit future redemption, etc. as will be apparent to those of skill in the art upon reading the present application. In one example, ticket 400 may also easily be folded to fit in sleeve 22 along with temporary card 32.

In one embodiment, providing the guest with temporary card 32 at 314 (FIG. 10) is performed in connection with a purchase transaction in which POS terminal 206 also processes a purchase being made by the guest. For example, the guest purchases merchandise previously selected from other areas of retail store 202 (e.g., product display 204). If a suitable incentive was offered with account application, in one embodiment, a discount is applied to the purchase since the account was approved (e.g., 10% the entire purchase). In one example, the purchase is charged to the associated account such as where the account is a credit or debit account.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. An account application product comprising:
    a package comprising:
        a first panel defining and extending between a first end and a second end, the first panel defining a first surface and a second surface opposite the first surface, each of the first surface and the second surface extending from the first end to the second end,
        a first pocket coupled with the first panel and positioned to form a storage chamber along the second surface of the first panel, and
        a second panel folded to define a second pocket having a storage cavity formed therein, the second panel being coupled to the first panel, and the second pocket being readily separable from a remainder of the package via a perforation line, wherein the second pocket is substantially credit card sized to fit within a wallet; and
    a terms sheet selectively stored in the storage chamber, wherein the terms sheet includes printed terms for a financial account associated with the account application product;
    wherein the terms sheet includes an account identifier indicating the financial account associated with the account application product wherein the account identifier is configured to be machine readable by a point-of-sale terminal.

2. The account application product of claim 1, wherein the terms sheet is a booklet, and the account identifier is one of a bar code, a magnetic strip, and a radio frequency identification device.

3. The account application product of claim 1, wherein the account identifier is configured to automatically initiate an electronic application process at the point-of-sale terminal when the account identifier is read by the point-of-sale terminal.

4. The account application product of claim 1, wherein the first pocket defines a cutout positioned to provide visual access to the account identifier on the terms sheet maintained within the storage chamber.

5. The account application product of claim 1, wherein each of the first panel, the first pocket, and the second pocket have substantially identical widths.

6. The account application product of claim 1, wherein the package is formed from a single contiguous piece of material folded to form the first panel, the first pocket, and the second pocket.

7. The account application product of claim 1, wherein the first pocket and the second pocket have substantially identical widths, and the first pocket has a height greater than about twice a height of the second pocket.

8. An account application product comprising
    a package comprising:
        a first panel defining and extending between a first end and a second end the first panel defining a first surface and a second surface opposite the first surface, each of the first surface and the second surface extending from the first end to the second end,
        a first pocket coupled with the first panel and positioned to form a storage chamber along the second surface of the first panel, and
        a second panel folded to define a second pocket having a storage cavity formed therein, the second panel being coupled to the first panel, and the second pocket being readily separable from a remainder of the package via a perforation line, wherein the second pocket is substantially credit card sized to fit within a wallet; and
    a terms sheet selectively stored in the storage chamber, wherein the terms sheet includes printed terms for a financial account associated with the account application product;
    wherein the first pocket defines a first open end such that the terms sheet slides into the storage chamber via the first open end in a first direction, the second pocket defines a second open end such that an item can be slid into the storage cavity via the second open end in a second direction.

9. The account application product of claim 8, wherein the first direction and the second direction are substantially perpendicular to one another.

10. An account application product comprising:
    a package comprising:
        a first panel defining and extending between a first end and a second end the first panel defining a first surface and a second surface opposite the first surface, each of the first surface and the second surface extending from the first end to the second end,
        a first pocket coupled with the first panel and positioned to form a storage chamber along the second surface of the first panel, and
        a second panel folded to define a second pocket having a storage cavity formed therein, the second panel being coupled to the first panel, and the second pocket being readily separable from a remainder of the package via a perforation line, wherein the second pocket is substantially credit card sized to fit within a wallet; and
    a terms sheet selectively stored in the storage chamber, wherein the terms sheet includes printed terms for a financial account associated with the account application product;
    wherein the second panel extends over the first surface of the first panel.

11. An account application product comprising:
    a package comprising:
        a first panel defining and extending between a first end and a second end the first panel defining a first surface and a second surface opposite the first surface, each of the first surface and the second surface extending from the first end to the second end,
        a first pocket coupled with the first panel and positioned to form a storage chamber along the second surface of the first panel;
        a second panel folded to define a second pocket having a storage cavity formed therein, the second panel being coupled to the first panel, and the second pocket being readily separable from a remainder of the package via a perforation line, wherein the second pocket is substantially credit card sized to fit within a wallet; and a terms sheet selectively stored in the storage chamber, wherein the terms sheet includes printed terms for a financial account associated with the account application product;

wherein the financial account is a credit card account.

12. An account application product comprising:
a package comprising:
  a first panel defining and extending between a first end and a second end the first panel defining a first surface and a second surface opposite the first surface, each of the first surface and the second surface extending from the first end to the second end,
  a first pocket coupled with the first panel and positioned to form a storage chamber along the second surface of the first panel;
  a second panel folded to define a second pocket having a storage cavity formed therein, the second panel being coupled to the first panel, and the second pocket being readily separable from a remainder of the package via a perforation line, wherein the second pocket is substantially credit card sized to fit within a wallet; and
a terms sheet selectively stored in the storage chamber, wherein the terms sheet includes printed terms for a financial account associated with the account application product;
wherein the storage cavity and the storage chamber are each thin, such that the storage cavity snugly receives the terms sheet, only when the terms sheet is folded in a substantially planar configuration.

13. An account application product comprising:
a package comprising:
  a first panel defining and extending between a first end and a second end the first panel defining a first surface and a second surface opposite the first surface, each of the first surface and the second surface extending from the first end to the second end,
  a first pocket coupled with the first panel and positioned to form a storage chamber along the second surface of the first panel, and
  a second panel folded to define a second pocket having a storage cavity formed therein, the second panel being coupled to the first panel, and the second pocket being readily separable from a remainder of the package via a perforation line, wherein the second pocket is substantially credit card sized to fit within a wallet;
a terms sheet selectively stored in the storage chamber, wherein the terms sheet includes printed terms for a financial account associated with the account application product; and
a substantially planar temporary account card selectively maintained in the storage cavity, wherein the substantially planar temporary account card identifies the financial account in a manner providing access to the financial account.

14. The account application product of claim 13, wherein the substantially planar temporary account card is printed on receipt paper by a point-of-sale terminal.

15. An account application product comprising:
a package comprising:
  a first panel defining and extending between a first end and a second end the first panel defining a first surface and a second surface opposite the first surface, each of the first surface and the second surface extending from the first end to the second end,
  a first pocket coupled with the first panel and positioned to form a storage chamber along the second surface of the first panel, and
  a second panel folded to define a second pocket having a storage cavity formed therein, the second panel being coupled to the first panel, and the second pocket being readily separable from a remainder of the package via a perforation line, wherein the second pocket is substantially credit card sized to fit within a wallet; and
a terms sheet selectively stored in the storage chamber, wherein the terms sheet includes printed terms for a financial account associated with the account application product;
wherein the second panel extends from the first end of the first panel and is folded about the first end of the first panel to extend over the first surface, the account application product includes a third panel extending from the second end of the first panel, and the third panel is folded about the second end of the first panel to at least partially define the first pocket.

16. An account application product comprising:
a package comprising:
  a first panel defining and extending between a first end and a second end the first panel defining a first surface and a second surface opposite the first surface, each of the first surface and the second surface extending from the first end to the second end,
  a first pocket coupled with the first panel and positioned to form a storage chamber along the second surface of the first panel;
  a second panel folded to define a second pocket having a storage cavity formed therein, the second panel being coupled to the first panel, and the second pocket being readily separable from a remainder of the package via a perforation line, wherein the second pocket is substantially credit card sized to fit within a wallet; and
a terms sheet selectively stored in the storage chamber, wherein the terms sheet includes printed terms for a financial account associated with the account application product;
wherein the second panel extends from a first end of the first panel and is folded relative to the first panel to form the second pocket spaced from the first end of the first panel and positioned over the first surface of the first panel.

17. A method of facilitating application for a financial account, the method comprising:
providing a package comprising:
  a first panel defining and extending between a first end and a second end, the first panel defining a first surface and a second surface opposite the first surface, each of the first surface and the second surface extending from the first end to the second end,
  a first pocket coupled with the first panel and positioned to form a storage chamber along the second surface of the first panel;
  a second panel folded to define a second pocket having a storage cavity formed therein, the second panel being coupled to the first panel the second pocket being readily separable from a remainder of the package via a perforation line, wherein when the second pocket is substantially credit card sized to fit within a wallet;
selectively positioning a terms sheet in the storage chamber, wherein the terms sheet includes printed terms for a financial account associated with the account application product; and
scanning an account identifier for a financial account on the terms sheet using a point-of-sale terminal to automatically initiate an application process for the financial account.

18. The method of claim 17, further comprising:
printing a temporary account access card with information identifying the financial account, and
sliding the temporary account access card into the second pocket of the package.

* * * * *